US012598528B2

(12) United States Patent
Bulakci et al.

(10) Patent No.: US 12,598,528 B2
(45) Date of Patent: Apr. 7, 2026

(54) CELL SELECTION

(71) Applicant: NOKIA TECHNOLOGIES OY, Espoo (FI)

(72) Inventors: Ömer Bulakci, Munich (DE); Konstantinos Samdanis, Munich (DE); Ahmad Awada, Munich (DE); Muhammad Naseer-Ul-Islam, Munich (DE)

(73) Assignee: Nokia Technologies Oy, Espoo (FI)

( * ) Notice: Subject to any disclaimer, the term of this patent is extended or adjusted under 35 U.S.C. 154(b) by 620 days.

(21) Appl. No.: 17/998,516

(22) PCT Filed: May 14, 2020

(86) PCT No.: PCT/EP2020/063537
§ 371 (c)(1),
(2) Date: Nov. 11, 2022

(87) PCT Pub. No.: WO2021/228401
PCT Pub. Date: Nov. 18, 2021

(65) Prior Publication Data
US 2023/0189111 A1 Jun. 15, 2023

(51) Int. Cl.
*H04W 4/00* (2018.01)
*H04W 36/00* (2009.01)
*H04W 36/30* (2009.01)

(52) U.S. Cl.
CPC ..... *H04W 36/30* (2013.01); *H04W 36/00837* (2018.08)

(58) Field of Classification Search
CPC ........... H04W 36/30; H04W 36/00837; H04W 28/26; H04W 36/22; H04W 48/18

USPC .......................................................... 370/331
See application file for complete search history.

(56) References Cited

U.S. PATENT DOCUMENTS

| | | | | |
|---|---|---|---|---|
| 6,370,572 B1 * | 4/2002 | Lindskog | ............. | H04Q 3/0062 |
| | | | | 709/223 |
| 6,400,951 B1 * | 6/2002 | Vaara | .................... | H04W 48/16 |
| | | | | 455/437 |
| 7,526,289 B2 * | 4/2009 | Schwarz | ............... | H04W 60/04 |
| | | | | 370/332 |

(Continued)

FOREIGN PATENT DOCUMENTS

| | | |
|---|---|---|
| GB | 2528986 A | 2/2016 |
| WO | WO 2010/017012 A1 | 2/2010 |
| WO | WO 2020/033424 A1 | 2/2020 |

OTHER PUBLICATIONS

"Update of use case in subclause 6.5", 3GPP TSG-SA5 Meeting #131e, S5-20xxxx, Agenda: 6.6.5, Nokia, May 25-29, 2020, 4 pages.

(Continued)

*Primary Examiner* — Amancio Gonzalez
(74) *Attorney, Agent, or Firm* — Nokia Technologies Oy

(57) ABSTRACT

It is provided a method, comprising generating a mobility ranking list based on received performance relevant information for a plurality of cells, wherein the performance relevant information indicates a performance of each of the cells of the plurality of cells, and the mobility ranking list indicates for each of the cells of the plurality of cells a respective priority for the respective cell to reserve a radio resource for a terminal; providing the mobility ranking list to at least one of the cells.

15 Claims, 9 Drawing Sheets

(56) References Cited

U.S. PATENT DOCUMENTS

| | | | | |
|---|---|---|---|---|
| 7,974,652 | B2 * | 7/2011 | Gerlach | H04W 72/541 |
| | | | | 455/522 |
| 8,364,156 | B2 * | 1/2013 | Chun | H04J 11/0069 |
| | | | | 455/449 |
| 8,442,536 | B2 * | 5/2013 | Yang | H04W 36/0094 |
| | | | | 455/436 |
| 8,611,237 | B2 * | 12/2013 | Lee | H04W 48/08 |
| | | | | 370/252 |
| 8,634,845 | B2 * | 1/2014 | Frost | H04W 36/324 |
| | | | | 455/436 |
| 8,639,260 | B2 * | 1/2014 | Fox | H04W 28/10 |
| | | | | 455/418 |
| 8,903,383 | B2 * | 12/2014 | Farnsworth | H04W 60/04 |
| | | | | 455/434 |
| 9,173,149 | B2 * | 10/2015 | Lee | H04W 36/0085 |
| 9,198,158 | B2 * | 11/2015 | Knauft | H04W 68/04 |
| 9,225,637 | B2 * | 12/2015 | Ramanujan | H04L 45/70 |
| 9,307,389 | B2 * | 4/2016 | Sun | H04W 8/186 |
| 9,338,720 | B2 * | 5/2016 | Wegmann | H04W 36/008375 |
| 9,591,542 | B2 * | 3/2017 | Zhao | H04W 4/06 |
| 9,668,270 | B2 * | 5/2017 | Vadassery | H04W 4/00 |
| 10,051,506 | B1 * | 8/2018 | Mistry | H04L 47/822 |
| 10,117,139 | B1 * | 10/2018 | Shahi | H04W 72/542 |
| 10,638,263 | B2 * | 4/2020 | Tian | H04W 4/023 |
| 10,945,194 | B2 * | 3/2021 | Lou | H04W 76/11 |
| 11,115,114 | B2 * | 9/2021 | Treesh | H04B 7/2041 |
| 11,140,544 | B2 * | 10/2021 | Yang | H04W 48/18 |
| 11,432,314 | B2 * | 8/2022 | Mishra | H04L 5/0007 |
| 11,641,605 | B2 * | 5/2023 | Deenoo | H04W 36/0085 |
| | | | | 370/331 |
| 11,856,467 | B2 * | 12/2023 | Koskela | H04B 7/0695 |
| 11,985,565 | B2 * | 5/2024 | Kim | H04W 36/0058 |
| 12,004,031 | B2 * | 6/2024 | Jin | H04W 36/085 |
| 12,010,569 | B2 * | 6/2024 | Parichehrehteroujeni | |
| | | | | H04W 36/0072 |
| 12,022,344 | B2 * | 6/2024 | Koskela | H04W 36/00837 |
| 12,107,711 | B2 * | 10/2024 | Haque | G06K 19/0708 |
| 12,192,837 | B2 * | 1/2025 | Sedin | H04W 36/0085 |
| 2017/0230881 | A1 * | 8/2017 | Yu | H04W 36/26 |
| 2018/0132155 | A1 * | 5/2018 | Pao | H04W 36/22 |
| 2019/0208438 | A1 | 7/2019 | Yang et al. | |
| 2022/0252736 | A1 * | 8/2022 | Fu | G01S 19/256 |
| 2022/0264257 | A1 * | 8/2022 | Hofmann | G01S 5/0072 |

OTHER PUBLICATIONS

"3rd Generation Partnership Project; Technical Specification Group Services and System Aspects; Management and orchestration; Man-agement Data Analytics (MDA) (Release 17)", 3GPP TS 28.104, V17.1.1, Sep. 2022, pp. 1-86.

Office action received for corresponding European Patent Application No. 20727943.1, dated Apr. 10, 2025, 4 pages.

"3rd Generation Partnership Project; Technical Specification Group Radio Access Network; NG-RAN; Xn application protocol (XnAP) (Release 16)", 3GPP TS 38.423 v16.1.0, (Mar. 2020), 334 pages.

"3rd Generation Partnership Project; Technical Specification Group Radio Access Network; NR; NR and NG-RAN Overall Description; Stage 2 (Release 16)", 3GPP Ts 38.300 v16.0.0, (Dec. 2019), 101 pages.

"3rd Generation Partnership Project; Technical Specification Group Radio Access Network; NR; User Equipment (UE) procedures in Idle mode and RRC Inactive state (Release 16)", 3GPP TS 38.304 v16.0.0, (Mar. 2020), 38 pages.

"3rd Generation Partnership Project; Technical Specification Group Services and System Aspects; Management and orchestration; Self-Organizing Networks (SON) for 5G networks (Release 16)", 3GPP TS 28.313 v0.3.0, (Mar. 2020), 43 pages.

"3rd Generation Partnership Project; Technical Specification Group Services and System Aspects; Management and orchestration; 5G performance measurements (Release 16)", 3GPP TS 28.552 v16.5.0, (Mar. 2020), 173 pages.

"3rd Generation Partnership Project; Technical Specification Group Services and System Aspects; Management and Orchestration; Concepts, use cases and requirements (Release 16)", 3GPP TS 28.530 v16.1.0, (Dec. 2019), 30 pages.

"3rd Generation Partnership Project; Technical Specification Group Services and System Aspects; Management and orchestration; Study on enhancement of Management Data Analytics (MDA) (Release 17)", 3GPP TR 28.809 v0.3.0, (Mar. 2020), 27 pages.

"3rd Generation Partnership Project; Technical Specification Group Services and System Aspects; Telecommunication management; Study on the Self-Organizing Networks (SON) for 5G networks (Release 16)", 3GPP TR 28.861 v16.0.0, (Dec. 2019).

"3rd Generation Partnership Project; Technical Specification Group Services and System Aspects; Management and orchestration; 5G end to end Key Performance Indicators (KPI) (Release 16)", 3GPP TS 28.554 v16.4.0, (Mar. 2020), 22 pages.

"3rd Generation Partnership Project; Technical Specification Group Services and System Aspects; System Architecture for the 5G System (5GS); Stage 2 (Release 16)", 3GPP TS 23.501 v16.4.0, (Mar. 2020), 430 pages.

First Examination Report for Indian Application No. 202247071142 dated Jan. 31, 2023, 7 pages.

International Search Report and Written Opinion for Patent Cooperation Treaty Application No. PCT/EP2020/063537 dated Jan. 25, 2021, 19 pages.

* cited by examiner

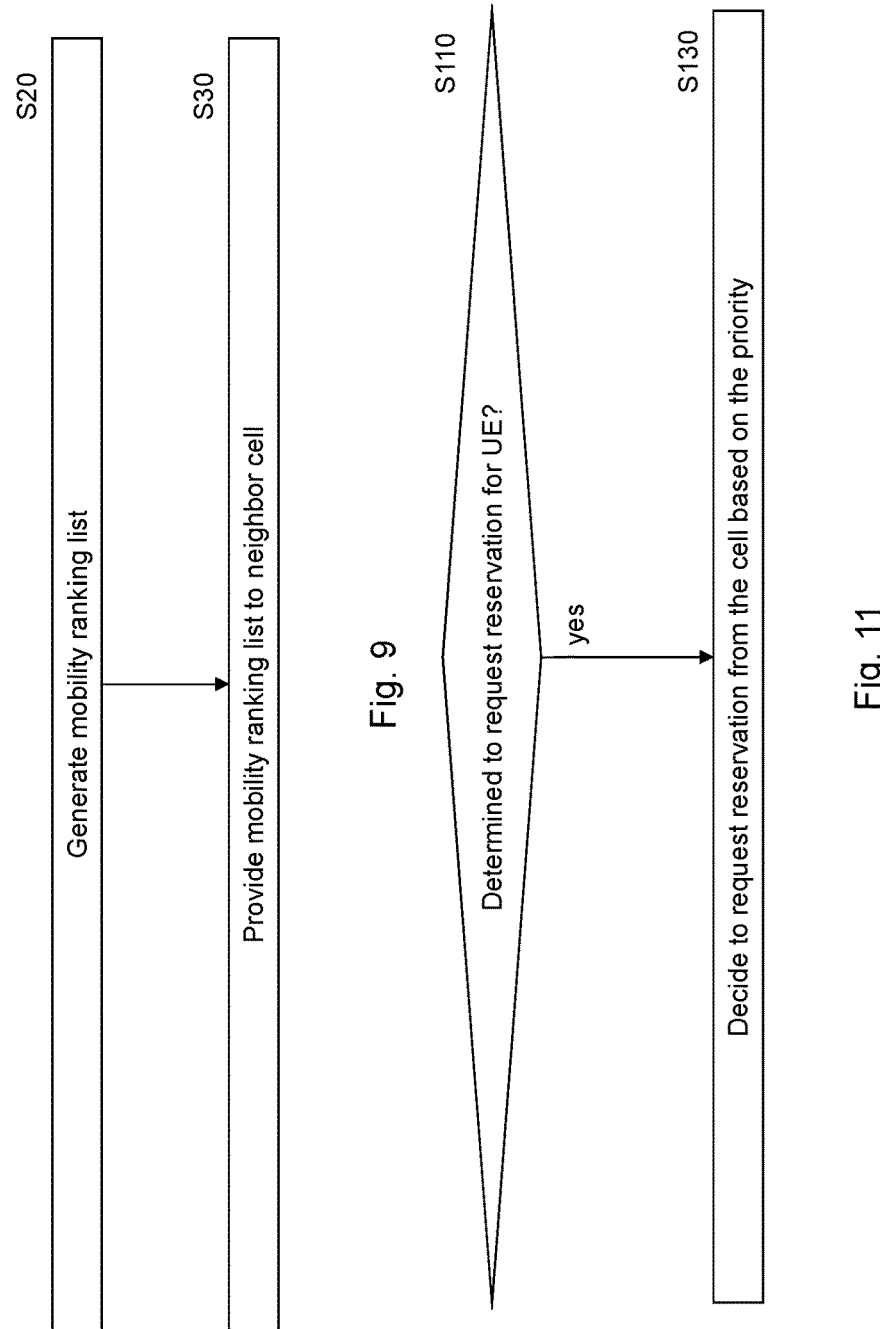
S20
Generate mobility ranking list
S30
Provide mobility ranking list to neighbor cell
Fig. 9
S110
Determined to request reservation for UE?
yes
S130
Decide to request reservation from the cell based on the priority
Fig. 11
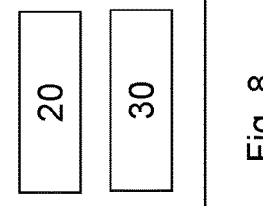
20
30
Fig. 8
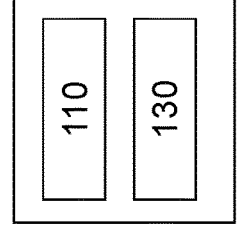
110
130
Fig. 10

CELL SELECTION

CROSS-REFERENCE TO RELATED APPLICATIONS

This application is a national phase entry of International Application No. PCT/EP2020/063537, filed May 14, 2020, the contents of which are hereby incorporated by reference in their entirety.

FIELD

The present disclosure relates to selecting of a cell for reserving a radio resource for a target. For example, it is related to selecting a target cell for conditional or (baseline) handover or for adding a secondary cell. The selecting may be slice-aware.

Abbreviations

3GPP 3$^{rd}$ Generation Partnership Project
3G/4G/5G 3$^{rd}$/4$^{th}$/5$^{th}$ Generation
5GS 5G system
AMF Access and Mobility Management Function
ANR Automatic Neighbor Relation
CHO Conditional Handover
CN Core Network
DAPS Dual Active Protocol Stack
DC Dual Connectivity
E2E end-to-end
eNB evolved Node B
FR Frequency Range
gNB NR base station
HO Handover
IP Internet Protocol
KPI Key Performance Indicator
LTE Long Term Evolution
MAC Media Access Control
MAC CE MAC Control Element
MDA Management Data Analytics
MDAF Management Data Analytics Function
MDAS Management Data Analytics Service
MDT Minimization of Drive tests
MLB Mobility Load Balancing
MNO Mobile Network Operator
MRO Mobility Robustness Optimization
MTC Machine-type Communication
NCR Neighbor Cell Relation
NE Network Element
NG Next Generation
NM Network Management
NR New Radio (=5G)
NSI Network Slice Instance
OAM Operation, Administration, Maintenance
OFDMA Orthogonal Frequency Division Multiple Access
PDU Protocol Data Unit
QoS Quality of Service
RA Registration Area
RAN Radio Access Network
RAT Radio Access Technology
RLF Radio Link Failures
RRC Radio Resource Control
SgNB Secondary gNB
SLA Service Level Agreement
S-NSSAI single network slice selection assistance information
SON Self-Optimizing Network TA Tracking Area
TAI Tracking Area Identity
TR Technical Report
TS Technical Specification
UE User Equipment (=terminal)
URLLC Ultra-Reliable Low-Latency Communication
Xn Interface between gNBs
XnAP Xn Application Part

BACKGROUND

Network slicing is one of the fundamental building blocks of the 5G system (5GS) for supporting diverse business requirements and vertical industries [1][2][3]. Network slices are logical self-contained networks that share a common infrastructure, which span over E2E network domains, i.e., core network, transport network, and radio access network (RAN). Network slicing related policies and network element (NE) configurations especially for RANs are provided by the network management (NM) system. Being business-driven, network slicing typically needs to ensure service-level agreement (SLA), e.g., throughout a given geographical area for a specified number of users.

The promised value creation by network slicing is only possible when the (business-driven) SLAs can be guaranteed. Yet, slicing also adds additional complexity, for handling several slices with diverging requirements not only in terms of service requirements, e.g., latency and throughput, but also in terms of network requirements, e.g., isolation, and user equipment (UE) distribution over time and space.

Depending on the slice tenant, needs, and the network deployment, the availability of network slices can vary geographically, where the granularity can be given in terms of slice support in tracking areas (TAs). Slice-support information of the neighboring TAs can be exchanged during Xn Set-Up and NG-RAN Node Configuration Update Procedures (see TAI Support List in [4]), as shown in FIG. 1. Here, the slice support information is provided per TA and is in the form of a set of slice IDs, i.e., single network slice selection assistance information (S-NSSAI).

Slice-aware mobility is based on the slice-support information and radio conditions in 3GPP Release15/Release 16. However, incoming protocol data unit (PDU) sessions of the supported slices can still be rejected because of, e.g., current load conditions, during the HO. An example of an Xn HO is illustrated in FIG. 3 taken from [1]. Briefly, the UE is configured with the measurement events considering the signal quality levels of the source and neighbor cells. When a measurement event is triggered, the source cell (gNB1 in FIG. 3) may determine the target cell (gNB2 in FIG. 3) considering current radio conditions and absolute slice support information of the target cell (i.e. which slices are supported) received previously over Xn interface. In the HO request, slice information is included (S-NSSAI per PDU session) and the target cell decides on the admitted and rejected PDU sessions.

Moreover, if a network slice is not supported by the target cell (e.g., considering a UE associated with multiple slices, where currently a UE can support a maximum number of eight slices simultaneously [1]), the corresponding PDU sessions are rejected by the target cell [4].

HO optimization is also considered in the context of SON for 5G networks by changing the HO triggering conditions considering radio conditions and additional KPIs [6][7]. Specifically, Mobility Robustness Optimization (MRO) deals with adjusting the HO conditions to ensure stability and avoid ping-pong effects, while the Mobility Load Balancing (MLB) alters the cell signal strength in order to balance the associated users' load among neighboring cells. These SON approaches are applied on a cell level without considering slicing and focus only on stability and load KPIs.

Management Data Analytics Function (MDAF) provides analytics for mobility management related issues to determine the nature of the mobility problem and provides an indication of the issue, e.g. lack of resources (such as, virtualization and radio resources), with the objective to increase the HO success rate by providing policies that aim to, e.g. adjust network resources scale-up/out or scheduling [5].

REFERENCES

[1] 3GPP TS 38.300, "NR; Overall description; Stage-2," v16.0.0, January 2020.
[2] 3GPP TS 23.501, "System architecture for the 5G System (5G5)," v16.4.0, March 2020.
[3] 3GPP TS 28.530, "Management and Orchestration; Concepts, use cases and requirements," v16.1.0, December 2019.
[4] 3GPP TS 38.423, "NG-RAN; Xn Application Protocol (XnAP)," v16.1.0, March 2020.
[5] 3GPP TR 28.809, "Study on enhancement of Management Data Analytics (MDA) (Release 17)," v0.3.0, March 2020
[6] 3GPP TS 28.313, "Self-Organizing Networks (SON) for 5G Networks", v0.3.0, March 2020.
[7] 3GPP TR 28.861, "Study on the Self-Organizing Networks (SON) for 5G networks", v16.1.0, December 2019.

SUMMARY

It is an object of the present invention to improve the prior art.

According to a first aspect of the invention, there is provided an apparatus comprising: one or more processors, and memory storing instructions that, when executed by the one or more processors, cause the apparatus to: generate a mobility ranking list based on received performance relevant information for a plurality of cells, wherein the performance relevant information indicates a performance of each of the cells of the plurality of cells, and the mobility ranking list indicates for each of the cells of the plurality of cells a respective priority for the respective cell to reserve a radio resource for a terminal; provide the mobility ranking list to at least one of the cells.

According to a second aspect of the invention, there is provided an apparatus comprising: one or more processors, and memory storing instructions that, when executed by the one or more processors, cause the apparatus to: generate a mobility ranking list based on performance relevant information, wherein the performance relevant information is related to each slice of a plurality of slices, and the mobility ranking list indicates for each slice of the plurality of slices a respective priority for providing a radio resource for a terminal served by the respective slice; provide the mobility ranking list to at least one neighbor cell.

According to a third aspect of the invention, there is provided an apparatus comprising: one or more processors, and memory storing instructions that, when executed by the one or more processors, cause the apparatus to: monitor if it is determined to request a reservation of a respective radio resource for a terminal from one of at least two cells; decide which of the at least two cells is requested to reserve the respective radio resource for the terminal based on a respective priority received for each of the at least two cells if it is determined to request the reservation of the respective radio resource for the terminal from one of the at least two cells, wherein for each of the at least two cells the respective priority indicates a priority for reserving the respective radio resource.

According to a fourth aspect of the invention, there is provided a method comprising generating a mobility ranking list based on received performance relevant information for a plurality of cells, wherein the performance relevant information indicates a performance of each of the cells of the plurality of cells, and the mobility ranking list indicates for each of the cells of the plurality of cells a respective priority for the respective cell to reserve a radio resource for a terminal; providing the mobility ranking list to at least one of the cells.

According to a fifth aspect of the invention, there is provided a method comprising: generating a mobility ranking list based on performance relevant information, wherein the performance relevant information is related to each slice of a plurality of slices, and the mobility ranking list indicates for each slice of the plurality of slices a respective priority for providing a radio resource for a terminal served by the respective slice; providing the mobility ranking list to at least one neighbor cell.

According to a sixth aspect of the invention, there is provided a method comprising: monitoring if it is determined to request a reservation of a respective radio resource for a terminal from one of at least two cells; deciding which of the at least two cells is requested to reserve the respective radio resource for the terminal based on a respective priority received for each of the at least two cells if it is determined to request the reservation of the respective radio resource for the terminal from one of the at least two cells, wherein for each of the at least two cells the respective priority indicates a priority for reserving the respective radio resource.

Each of the methods of the fourth to sixth aspects may be a method of cell selection.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:

Success rate of (e.g., conditional and baseline) handovers may be increased;

SLA requirements for a slice may be easier fulfilled;

Solution may be tailored according to the needs;

modification of UEs may not be needed.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 8 shows an apparatus according to an embodiment of the invention;

FIG. 9 shows a method according to an embodiment of the invention;

FIG. 10 shows an apparatus according to an embodiment of the invention;

FIG. 11 shows a method according to an embodiment of the invention;

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments of this invention address slice-aware mobility in wireless and mobile communication systems such as 5G, where a network slice is configured and operated. More specifically, a proactive method and the associated mechanisms are proposed to enhance the rate of successful handovers (HOs) within a network slice, and hence to facilitate guaranteeing the desired performance. For this purpose, slice characteristics such as slice network requirements and specific Key Performance Indicators (KPIs) are taken into account alongside with radio conditions. Some embodiments of the invention also provide a proactive method and the associated mechanisms to enhance the rate of successful handovers (HOs) even without network slicing.

Currently, HOs are performed based primarily on radio conditions, without considering other network KPIs, e.g. load, delay, etc., with respect to a given service that is offered e.g. by a network slice.

Figure 1:
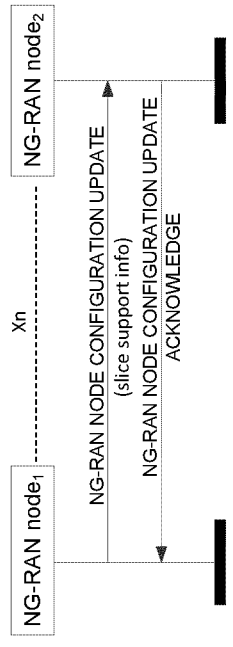
FIG. 1 shows slice support information exchange over Xn interface.
Figure 1:
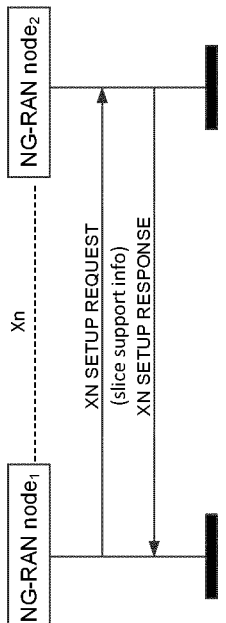
Figure 2:
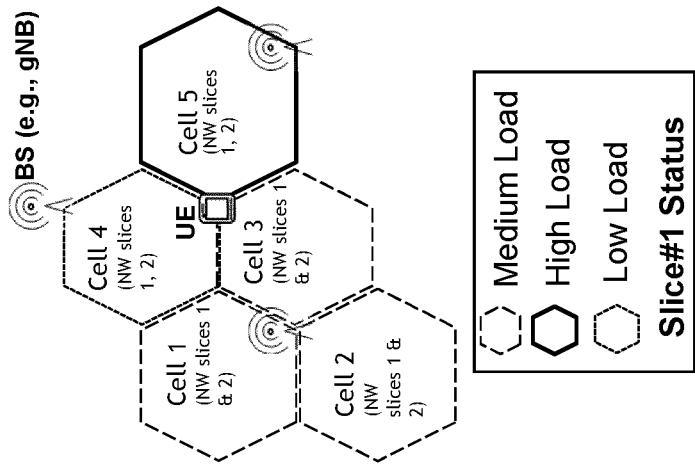
FIG. 2 shows a scenario illustrating network slice support and load status from the perspective of network slice #1.

In a cell supporting a slice, the actual status of a network slice can vary. For example, load and UE distribution associated with a network slice can have spatial and temporal dimensions (i.e., may vary dynamically in time and space). FIG. 2 illustrates a scenario where different cells have the same absolute slice support; however, from the network slice #1 perspective, cell 5 is overloaded and cell 4 has low load. Here, the absolute support can be understood as whether a cell supports the slice or not (i.e. a slice is available on that cell), without indicating the degree of the support. For a User Equipment (UE) (attached to slice #1), which is served by cell 3 and is about to be handed over, the serving cell may select cell 5 despite the fact that it is overloaded, if the HO decision is based on radio conditions alone.

Therefore, considering only radio conditions and, if slicing is relevant, the absolute slice support information may cause a problem such that a non-optimal target cell is selected. In turn, such non-optimal target cell selection may increase the number of HO rejections, i.e. a rejected HO will bounce back initiating a follow up HO with a different target cell. HO rejections not only cause increased signaling overhead but also delay the triggering of the handover which can result in radio link failures (RLFs). Such delay caused by HO rejections and re-trying with another target cell can be critical e.g. for the performance of Ultra-Reliable Low Latency Communication (URLLC) services. Moreover, HOs toward a cell that cannot satisfy the desired KPIs (e.g. an overloaded cell), can violate the SLA while also reducing the resource efficiency. This can substantially impact the slice SLA assurance in terms of continuity and the performance of the offered services.

This problem may become more evident in heterogeneous networks with overlapping coverage areas, e.g., inter-frequency deployments. Such deployments offer more possibilities that a UE has multiple HO candidate cells even at the same location and careful policy configuration should be done to avoid unnecessary HO delays and to select the best HO target cell in the first attempt.

Figure 3:
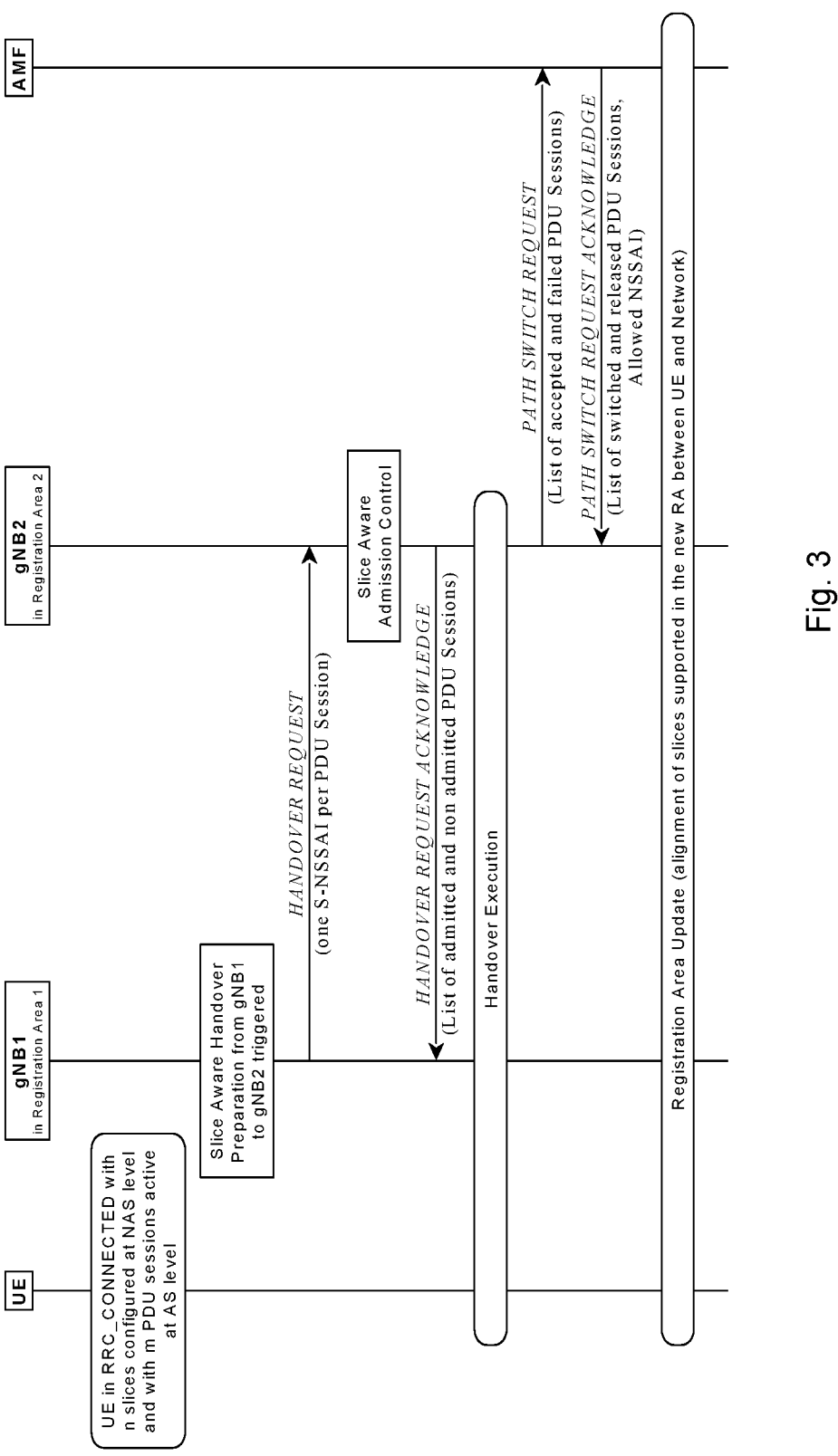
FIG. 3 shows an example of an Xn HO procedure according to [1]

The prior art (e.g. FIG. 3) applies reactive mechanisms and does not take into account the temporal and spatial variations in the slice status or of the cell, respectively, which can cause HO rejections and RLFs, and, thus, may potentially cause an increased latency and signaling overhead. Some example embodiments of this invention enhance conventional MDAS producer by providing a HO policy based on ranking of target base stations and/or target cells considering also the inter-frequency or heterogeneous overlapping environments. Thus, they increase the HO success rate, reduce latency, and signaling overhead.

Some example embodiments of this invention provide a proactive method to avoid frequent HO rejections based on a ranking policy related to target base stations and/or target cells. A base station (BS) is an access node, which can be, e.g., a 5G BS or a 5G gNB. It may provide one or more cells. In some example embodiments, such ranking policy is provided by MDAS producer.

The current MDAS producer does not contain a detailed solution related to mobility management issues but describes potential solutions to identify and resolve resource adjustment problems. In addition, as far as the current MDAS producer is related to mobility management issues, it does not consider slicing and service-specific KPIs in deciding policies. In addition, MDAS producer does not provide a policy towards gNB for prioritizing the selection of a target cell in order to minimize HO rejections.

If the ranking policy is provided by MDAS producer, the benefits of MDAF are leveraged. For example, MDAS producer may put forth one or more proposals by:

> analyzing HO issues considering service KPIs to provide a HO policy by ranking the related target base stations, i.e. listing of suggested target base stations to perform a HO in order to reduce HO rejections.
>
> extending its scope with respect to slicing, in addition to network conditions considering additional service and/or slice specific KPIs, e.g. latency.
>
> ranking the target base stations; such ranking can then be provided as a policy to selected base stations
>
> considering timing in the process of ranking target base stations, i.e. indicating when and for how long certain HO conditions apply and with respect to which slice and/or service, avoiding also in this way too early or too late decisions.

The ranking may be applied to different scenarios including inter-frequency deployment, i.e. overlapping coverage. In this case, the ranking may potentially avoid modifying the resource allocation of the target base station. The ranking can be associated with a BS and/or one or more cells of a BS.

> Such policies can be implemented such as:
>
> Example 1: Per S-NSSAI, assign Absolute Priorities {List of Target Cells with decreasing priority}; Valid for ΔT; Criticality Level
>
> Example 2: Per S-NSSAI, assign Weighted Priorities for triggering HOs to target gNB Tuples {[x % UEs to CGI A, y % UEs to CGI B] with decreasing priority}}; Valid for ΔT; Criticality Level
>
> Example 3: Per S-NSSAI assign Blacklist Bitmap {List of Target Cells with 1 OK 0 NOK}; Valid for ΔT; Criticality Level Here the criticality level can refer to the importance of the information related to problem assessment and thus may affect the processing of the information at the target entity. The criticality level can exemplarily map to one of a critical, medium, or low levels. Accordingly, RAN can then make HO decisions considering both the proposed slice-aware mobility ranking list and radio conditions. Thus, successful HOs can be statistically increased, achieving better service performance and slice continuity.

Some example embodiments of the invention can be implemented in a centralized way (using MDAF), or in a distributed way, or in a hybrid way. That is, the approaches can be outlined as:

> MDAF-based Centralized Approach:
>
> > Management data analytics service (MDAS) producer collects performance KPIs and UE context, create a slice-aware mobility ranking, and distribute it to the neighbor cells in the form of Neighbor Cell Relation (NCR) Tables
>
> Distributed Approach:
>
> > Neighboring cells exchange slice-aware mobility ranking list over the Xn procedures (Xn Set-Up, NG-RAN Config Update). Here, the list may be implemented differently than according to the centralized approach because of the locally available information which may be typically less than the centrally available information. Thus, for the distributed approach Example 3 above could be utilized as:
> >
> > Example 4: Per S-NSSAI assign Blacklist Bitmap {1 OK 0 NOK}; Valid for ΔT; Criticality Level
> >
> > The slice-aware mobility ranking list can then be utilized for Xn-based HO.

> Hybrid Approach:
>
> > The centralized and distributed approaches can be considered collectively, which can be implemented as a hybrid approach.

Some example embodiments are described with respect to handover (also named baseline handover). However, some example embodiments of the invention (irrespective of the approach (centralized/distributed/hybrid)) may be applied to other scenarios where a radio resource is to be reserved for a UE served by a slice, e.g.:

> Conditional HO (CHO): The slice-aware mobility ranking list is utilized for determining the prepared cells for the CHO and for configuring the HO parameters of CHO execution condition, i.e., UE executes the HO to a target cell when its corresponding CHO execution condition, that is evaluated by the UE, is fulfilled. The CHO execution conditions are configured by the source cell when sending CHO commands of the prepared target cells containing target cell configurations.
>
> Secondary Node Addition: The slice ranking list can be utilized for the selection of the S-Node for the dual connectivity (DC).

The slice-aware mobility ranking list (also referred to as slice ranking list herein) can be utilized for other mechanisms, e.g., dual active protocol stack (DAPS) HO or make-before-break HO. The ranking list can be utilized, e.g., for the mobility decisions of at least one terminal or a group of terminals.

Hereinafter, some example embodiments of the invention are described at greater detail.

MDAF-Based Centralized Approach

As highlighted in [5], management data analytics (MDA) provides a capability of processing and analyzing the raw data related to network, UE service events and network status (e.g., performance measurements, UE latency or throughput and fault supervision), to provide analytics report (including policies) to enable the necessary actions for network and service operations. MDAF can be realized in terms of a domain MDAF entity, e.g., for RAN, and a cross-domain MDAF entity, e.g., for coordination between RAN and Core Network domains.

An MDAS producer, regardless if domain MDAF or cross-domain MDAF, that provides a slice-based ranking list regarding target base stations or cells for UE mobility may use the following network and UE related measurements:

> Network and UE history info:
>
> > Radio Conditions measurements
> >
> > > Average/distribution of UE reported RSRP/RSRQ/SINR of each neighboring cell
> > >
> > > Radio resource utilization of each neighboring cell (clause 5.1.1.2 of 3GPP TS 28.552)
> > >
> > > CQI (Channel quality Indicator) related measurements (clause 5.1.1.11 of 3GPP TS 28.552)
> > >
> > > UE location information provided by the Location Services (LCS)
> > >
> > > QoE (Quality of Experience) reports based on Minimization of Drive Tests (MDT) measurements
> > >
> > > QoS flow and DRB Retainability, how often an end-user abnormally loses a QoS flow/DRB during the time the QoS flow/DRB is used (clause 6.5 of 3GPP TS 28.554)
> >
> > Delay measurements
> >
> > > Packet delay measurements (clause 5.1.33 of 3GPP TS 28.552)
> > >
> > > IP Latency measurements (clause 5.1.3.4 of 3GPP TS 28.552)
> > >
> > > End-to-End delay of 5G network (clause 6.3.1 of 3GPP TS 28.552)

History for intra-gNB HO (clause 5.1.1.6 of 3GPP TS 28.552)

Number of requested/successful/failed handover preparation (also applies for inter-gNB HO)

Number of requested/successful/failed handover resource allocations

Number of requested/successful/failed handover executions

Mean Time of requested handover executions

Slice-based load information

Inter-gNB handovers (number of requested/successful/failed HOs—resource preparation) (clause 5.1.1.6.2 of 3GPP TS 28.552)

Throughput for Network Slice Instance (Upstream/downstream) (clauses 6.3.2 and 6.3.4 of 3GPP TS 28.554)

Throughput at N3 interface (Upstream/downstream) (clauses 6.3.4 and 6.3.5 of 3GPP TS 28.554)

Virtualised Resource Utilization of NSI: utilization % of virtualised resources (e.g. processor, memory, disk) allocated to a NSI to the system capacity allocated to the NSI (clause 6.4.2 of 3GPP TS 28.554)

Packet loss rate, packet drop rate (Upstream/downstream)

Mean number of registered subscribers in AMF per slice (clause 5.2.1 of 3GPP TS 28.552)

UE-associated logical NG-connection related measurements between gNB and AMF (clause 5.1.1.16 of 3GPP TS 28.552)

Number of active UEs (clause 5.1.1.2 of 3GPP TS 28.552

Frequency Priority Information (i.e., based on the deployment) set by the MNOs

Absolute priorities for different NR frequencies or inter-RAT frequencies (clause 5.2.4.1 of 3GPP TS 38.304)

E2E measurements may be collected on cross-domain MDAF that may deal with this mobility management related issue. For the other measurements, a domain MDAF, e.g. RAN, may be sufficient. It should be also noted that the above list indicates an example set of information such that it can be extended when new information becomes available, e.g., with future 3GPP releases. In some example embodiments, MDAF may utilize only a subset of the above list.

With the above-mentioned context information, MDAS producer may generate an analysis report comprising e.g.:

Root Cause indication and type—(Temporal Load, Radio conditions, Edge of Slice, Reliability/Latency)

Duration of ranking validity—How long this situation would last

Location—geographical area, cell IDs, etc.

Objects involved in RAN, i.e. gNB list, cells

RAT indication, i.e., which radio technology is involved in the problem

Criticality/Severity Level, e.g., critical, medium, low

Policies: Ranking of cells with respect to (i) slice, and/or (ii) indicated KPIs, e.g. throughput, reliability/latency, etc. and/or (iii) service priority, etc.

MDAF may be a stand-alone function or it may be provided by a network function or network element or network entity, e.g., an MDAS producer.

The analysis report can be translated into the policies. The policies may be provided to the cells e.g. at the following occasions:

1. The slice-aware mobility ranking list may be updated in the gNB based on a threshold-based update trigger, e.g., a significant change in the UE distribution; and/or 2. The slice-aware mobility ranking list may be updated periodically.

In the first case, it is ensured that the mobility ranking list available in the gNB reflects significant changes in the load (e.g. UE distribution or load over a threshold) immediately such that decisions are met based on a reliable mobility ranking list.

In some example embodiments, a set of one or more slice-aware mobility ranking lists may be provided with a time tag, where the gNB can execute a given list based on the daytime and/or a day of the week indicated for the respective list.

Figure 4:
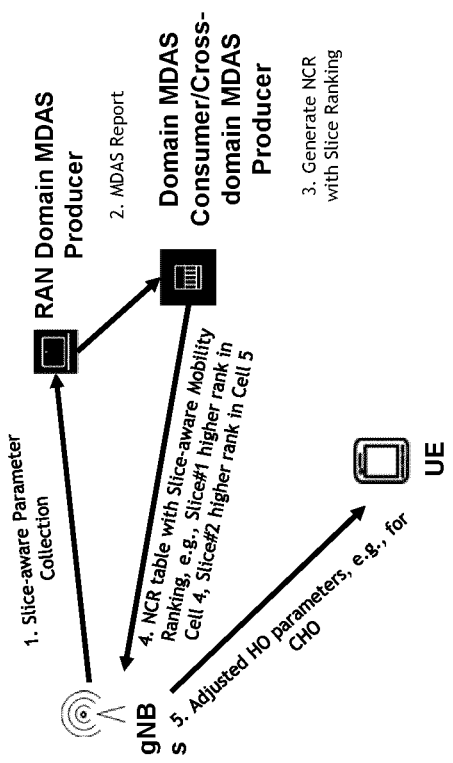
FIG. 4 shows a method of the MDAF-based centralized approach according to some example embodiments of the invention.

Accordingly, MDAS producer may be utilized to provide slice-aware mobility ranking list and communicate the mobility ranking list to the gNBs. Some procedures of an MDAF-based centralized approach according to some example embodiments of the invention are explained with reference to FIG. 4, based on the scenario of FIG. 2:

1. RAN-domain MDAS producer collects the context from the gNBs

2. RAN-domain MDAS producer prepares the Report, which is sent to i. gNB if the performance measurements involve only RAN measurements after generating a Neighbor Cell Relation (NCR) table with Slice-aware Mobility Ranking ii. the Domain MDAS Consumer if the performance measurements include also E2E attributes 3. In case of 2.ii, Domain MDAS Consumer (which is a Cross-domain MDAS Producer in this case) generates a Neighbor Cell Relation (NCR) table with Slice-aware Mobility Ranking based on the Report received from the RAN-domain MDAS Producer, SLA Info, and Frequency Priority Info 4. Cross-domain MDAS Producer provides the NCR with Slice-aware Mobility Ranking to the gNBs.

5. gNBs can also adjust the HO parameters considering the NCR with slice ranking, e.g., in case of conditional HO (CHO).

In some example embodiments, MDAS Producer may provide the NCR with slice aware mobility ranking to MLB SON function, which may use it for optimizing the network.

In some other example embodiments, domain MDAF may be omitted, and cross-domain MDAF may evaluate all the data from the network functions. In still other example embodiments, cross-domain MDAF may be omitted, and domain MDAF may evaluate the data available to it and generate the NCR with slice ranking based on these data. MDAS means the application programming interface (API) that provides the MDAS producer—MDAS consumer communication, and MDAF is the function providing the analytics.

In some example embodiments, the NCR may comprise a validity time and/or validity duration for the slice ranking. In some example embodiments, the validity time and/or validity duration for the slice ranking may be predefined such that the NCR need not comprise an indication thereof. In some example embodiments, the slice ranking may be valid until it is updated by another slice ranking.

The slice ranking list can be utilized for different procedures, e.g., Xn-based HO, NG-based HO, CHO, DAPS, and secondary node addition.

The centralized approach has the following advantages:

The HO rejections can be statistically reduced (data analytics approach)

The gNBs can make use of the Ranking List to determine the target gNBs for UE mobility This can ensure the desired performance as well as service and slice continuity, e.g., especially for latency-critical slices and/or high priority slices with stringent SLAs Distributed Approach The slice-aware mobility ranking lists can be generated locally by the gNBs considering the available information at the gNB. The information collected by gNBs, e.g. slice load, local radio conditions, and MDT of residing UEs, may not be as extensive as that available at MDAF, i.e. it cannot include E2E analytics, and can be rather short-term. Nevertheless, such locally generated slice-aware mobility ranking list can be still utilized to improve the HO decisions and/or SgNB addition decisions. In the following, example embodiments are provided.

Figure 5:
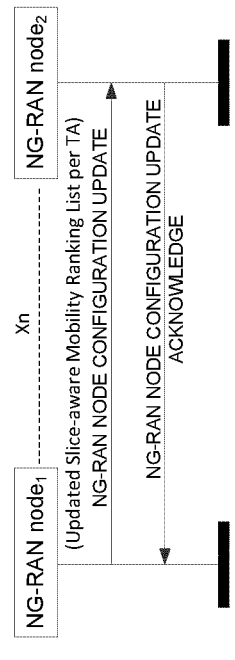
FIG. 5 shows message flows for exchange of slice-aware mobility ranking list in a distributed approach during Xn setup or NG-RAN Node configuration update according to some example embodiments of the invention.
Figure 5:
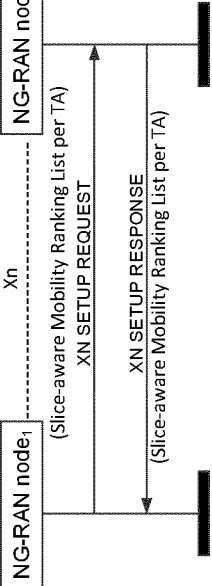

In the distributed approach, the slice-aware mobility ranking list is generated by gNBs and communicated to other gNBs over the XnAP procedures, as shown in FIG. 5 for Xn setup request and NG-RAN Node configuration update:

0. A gNB generates a Slice-aware Mobility Ranking List

1. The Slice-aware Mobility Ranking List is communicated to the neighbor gNBs via Xn Set-Up Procedure, e.g., after discovering a new cell via automatic neighbor relation (ANR), or when the new Xn interface is configured in the gNB.

2. When the Slice-aware Mobility Ranking List is updated, the updated Slice-aware Mobility Ranking List is communicated to the neighbor cells via NG RAN Node Configuration Update Procedure. The slice-aware mobility ranking list may be updated based on the changes in the slice's KPI, e.g. load situation changed beyond a defined delta value. In some example embodiments, it may also be updated periodically.

The slice-aware mobility ranking list may then be utilized for Xn-based HO, e.g., for determining a target cell for a UE or for a group of one or more UEs that are associated with a slice. Thus, the rate of successful handovers may be increased, and latency may be reduced.

In some example embodiments, the slice aware mobility ranking list may be transmitted between the gNBs by a command dedicated to that purpose (not shown in FIG. 5).

The advantages of the distributed approach can be outlined as:

The gNB has the real time information on the slice status. Thus, more short-term mobility issues can be solved via the distributed approach.

The gNB can determine a target cell with higher mobility success for a given slice.

Further Embodiments

As mentioned above, after obtaining the slice-aware mobility ranking list via above approaches, the list can be used for CHO and S-Node addition. In the following, the distributed approach is exemplarily used for obtaining the slice-aware mobility ranking list.

Distributed Approach for CHO

Figure 6:
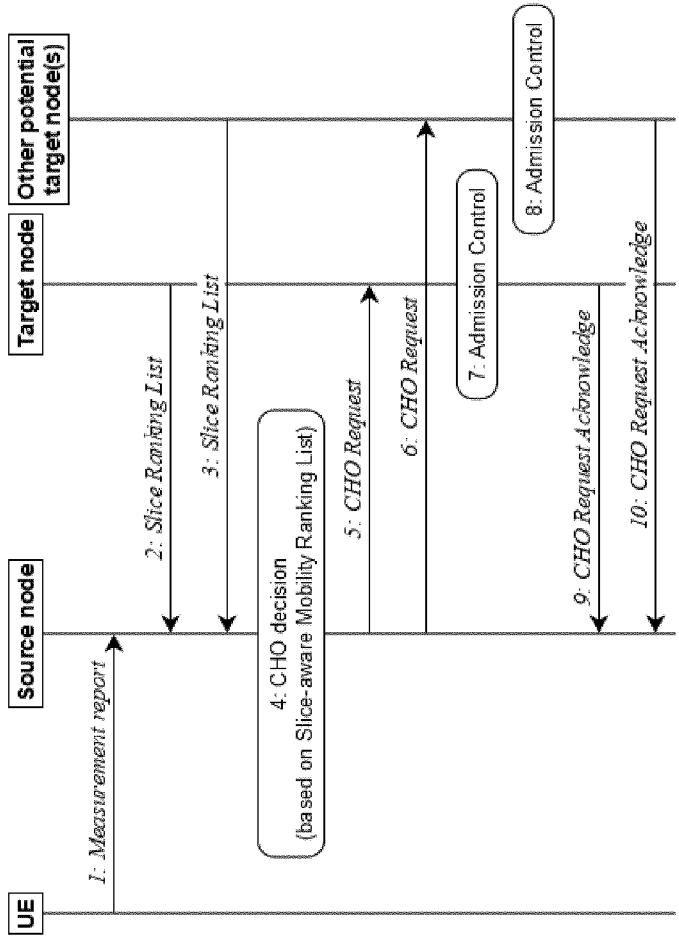
FIG. 6 shows a method of the distributed approach for CHO according to some example embodiments of the invention.

A gNB generates a Slice Ranking List from the Slice Support List based on e.g. slice load, local radio conditions, MDT of residing UEs, and frequency priority info. Via the Approach for Xn HO, the Slice Ranking List and the associated updates are communicated to the neighbor gNBs via Xn. FIG. 6 shows a message flow according to some example embodiments of the invention, based on the scenario shown in FIG. 2:

Message 1: UE provides measurement report to its serving gNB (source node).

Messages 2/3: Potential target node(s) may share with the source node slice-aware Mobility Ranking List. The sharing can be triggered by the target node or based on request from source node. In another example, the slice-aware Mobility Ranking List may be provided by the target node in CHO Request Acknowledge if some of the PDU sessions were not admitted due to e.g. load issues, for instance. In some example embodiments, potential target node(s) may provide their slice-aware Mobility ranking List periodically to the source node.

Action 4: Source node decides to prepare CHO based on the received slice-aware mobility ranking list(s) & the allowed S-NSSAI(s) of the UE.

In messages/actions 5 to 10, CHO preparation is performed as conventionally known.

The advantage of this approach is that CHO success probability may be increased by utilizing the ranking list.

Distributed Approach for S-Node Addition in Case of Dual Connectivity (DC)

A gNB generates a Slice Ranking List from the Slice Support List based on e.g. slice load, local radio conditions, MDT of residing UEs and frequency priority info. The Slice Ranking List and the associated updates may be communicated to the neighbor gNBs via Xn interface. This is shown in FIG. 7:

1. The S-NG-RAN node is determined based on the slice ranking list and the allowed S-NSSAI of the UE 2. When the Slice Ranking List is updated, the update can be communicated via the S-Node Modification Required procedure 3. Depending on the updated slice ranking, the S-NG-RAN node can be A. Kept as before; or B. Another S-NG-RAN Node may be preferred and configured by M-NG-RAN node.

The advantage of this approach is that, if DC is utilized, slice-aware DC can ensure the fulfillment of slice SLAs. This is particularly advantageous for URLLC services.

Figure 7:
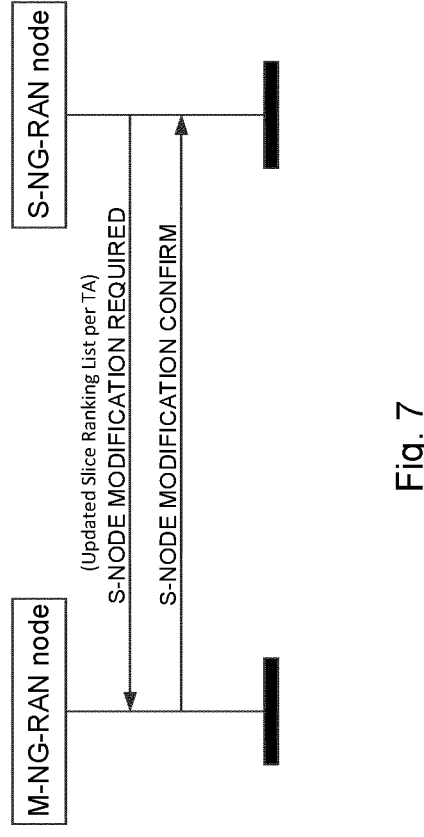
FIG. 7 shows message flows for exchange of slice-aware mobility ranking list in a distributed approach in S-Node modification (e.g. addition) according to some example embodiments of the invention.

As shown in FIG. 7, the command S-Node modification required may comprise the slice ranking list if the same is updated. However, in some example embodiments, instead, a dedicated command may be used to update the slice ranking list. Furthermore, the slice ranking may be provided for a tracking area or a cell, i.e., there may be different granularity in terms of the access network elements where such a slice ranking is applied.

FIG. 8 shows an apparatus according to an embodiment of the invention. The apparatus may be a cell represented by a base station, or an element thereof. FIG. 9 shows a method according to an embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for generating 20, and means for providing 30. The means for generating 20, and means for providing 30 may be a generating means, and providing means, respectively. The means for generating 20, and means for providing 30 may be a generator, and a provider, respectively. The means for generating 20, and means for providing 30 may be a generating processor, and providing processor, respectively.

The means for generating 20 generates a mobility ranking list based on performance relevant information (S20). The performance relevant information is related to each slice of a for the plurality of slices. The mobility ranking list indicates for each slice of the plurality of slices a respective priority for providing a radio resource for a terminal served by the respective slice.

The means for providing 30 provides the mobility ranking list to at least one neighbor cell (S30).

FIG. 10 shows an apparatus according to an embodiment of the invention. The apparatus may be a cell represented by a base station, or an element thereof. FIG. 11 shows a method according to an embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for monitoring 110, and means for deciding 130. The means for monitoring 110, and means for deciding 130 may be a monitoring means, and deciding means, respectively. The means for monitoring 110, and means for deciding 130 may be a monitor, and a decider, respectively. The means for monitoring 110, and means for deciding 130 may be a monitoring processor, and deciding processor, respectively.

The means for monitoring 110 monitors if it is determined to request, from one of at least two cells, a reservation of a respective radio resource for a terminal (S110). The terminal may potentially be served by a slice. The reservation may be e.g. for a handover, a conditional handover, or for adding a secondary cell.

If it is determined to request the reservation of the respective radio resource for the terminal from one of the at least two cells (S110=yes), the means for deciding 130 decides which of the at least two cells is requested to reserve the respective radio resource for the terminal (S130). The decision is met based on a respective priority received for each of the at least two cells. For each of the at least two cells the respective priority indicates a priority for reserving the respective radio resource.

Figure 13:
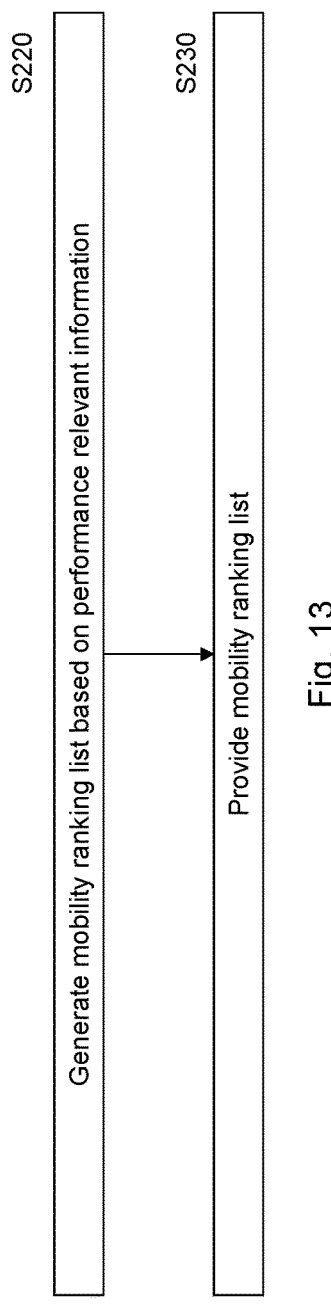
FIG. 13 shows a method according to an embodiment of the invention.
Figure 12:
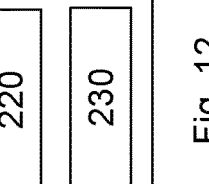
FIG. 12 shows an apparatus according to an embodiment of the invention.

FIG. 12 shows an apparatus according to an embodiment of the invention. The apparatus may be an analytics function, such as a MDAF, or an element thereof. FIG. 13 shows a method according to an embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for generating 220, and means for providing 230. The means for generating 220, and means for providing 230 may be a generating means, and providing means, respectively. The means for generating 220, and means for providing 230 may be a generator, and provider, respectively. The means for generating 220, and means for providing 230 may be a generating processor, and providing processor, respectively.

The means for generating 220 generates a mobility ranking list based on received performance relevant information for the plurality of cells (S220). The mobility ranking list indicates for each cell of the plurality of cells a priority for the respective cell to reserve a radio resource for a terminal.

The means for providing 230 provides the mobility ranking list to at least one of the cells (S230). Typically, the means for providing provides the mobility ranking list to all of the cells.

Figure 14:
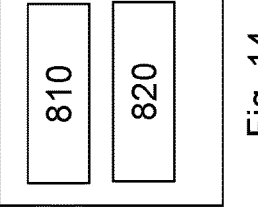
FIG. 14 shows an apparatus according to an embodiment of the invention.

FIG. 14 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 9, 11, and 13 and related description.

Some example embodiments are described where the cell load per slice is taken as an example indicator. The cell load is taken for illustration purposes. In case of interference limited intra-frequency deployments (such as in FR1), the UE may be able to connect to more than one neighboring cell if it is located at the border area of neighboring cells, e.g. cell 4 and 5 as shown in FIG. 2. On the other hand, the UE may be able to connect to more than one neighboring cell in much larger geographical area in 1) noise limited intra-frequency scenarios where the UE and the network may apply beamforming with multi-panels (such as in FR2 and NR above 52.6 GHz, where interference can be canceled by the UE by applying receive beamforming) and 2) in inter-frequency deployments where cell 4 and cell 5 could be operating on different frequencies.

Typically, the slice support is indicated per TA. I.e., all the cells of a TA support the same slice(s). However, the invention is not limited to such configurations. For example, slice support may be indicated for each gNB or even for each cell. Some example embodiments of the invention do not consider slicing but just consider the priority of cells for reserving a radio resource (e.g. for HO, CHO, or addition of a SCell).

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

According to current 3GPP specifications, S-NSSAI is used to denote a slice unambiguously. However, the invention is not limited to these denotations. A slice may be defined by some other identity.

In the present application, a UE is an example of a terminal. The terminal may be e.g. a mobile phone, a smart phone, a MTC device, a laptop etc. The user may be a human user or a machine (e.g. in MTC).

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a cell represented by a base station such as a eNB or gNB, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

Some example embodiments of the invention provide a 3GPP contribution as follows:

6.5 Mobility Management Related Issues 6.5.1 Handover Optimization 6.5.1.1 Use Case Current handover procedures are mainly based on radio conditions for selecting the target gNB upon a handover. The target gNB accepts or rejects the handover (HO) request depending on various conditions. In virtualized environments, the HO may be rejected due to inadequate available resources within the target gNB. The notion of such resources may include virtual resources (e.g., compute, memory) and/or radio resources (e.g., PRB, RRC connected users). If the HO request is rejected, a UE will try to connect to a different gNB until the request is successfully accepted. Several target gNBs can be tried until the request is successfully accepted, considering the radio conditions for prioritizing as a primary criterion. This process can result in wastage of UE and network resources, while it may also introduce service disruption due to increased latency and radio link failures (RLFs). In addition, it can introduce inefficiency in the HO or other network procedures.

To address this handover optimization issue, it is desirable to use MDAS (Management data analytic service) to provision and/or select a particular target gNB for HO in order to reduce or even avoid HO rejections.

The MDAS producer provides a HO optimization analytics report containing the current and/or future/predicted resource consumption, network capabilities and other KPIs' status with respect to a specific service or slice as well as the expected QoE or QoE statistics for the target gNB. The analytics report also provides recommended actions to optimize the resource configuration or the selection of target gNB to accommodate the HO. Based on the report, MDAS consumer adjusts (e.g., scale-out/up the virtual resource, re-schedule/optimize radio resource) the resources before continuing with the HO and/or adjusts the selection of the target gNB by also considering the overlapping coverages of inter-frequency and inter-RAT deployments."

6.5.1.2 Potential Requirements

REQ-HO_OPT_CON-4 The MDAS producer should have a capability to provide an analytics report indicating a selection priority, i.e. ranking, for the target cell, among a set of candidate inter-frequency cells.

REQ-HO_OPT_CON-5 The MDAS producer should have a capability to provide an analytics report indicating a list of target cells to spare, i.e. avoid, a handover for an indicated time period.

REQ-HO_OPT_CON-6 The analytics report describing inter-frequency target cell selection for handover should provide an analytics report with respect to a specific service or slice. 6.5.1.3 Possible solutions 6.5.1.3.1 Solution Description The MDAS producer correlates and analyzes the ongoing and/or potential handover optimization issues based on the current and historical performance data related to handover performance considering intra-gNB and inter-gNB handover measurements as well as other performance measurements including network load, E2E latency, retainability and radio conditions, UE measurements including MDT, location and QoE for the network or network slices. The MDAS producer can provide the analytics report as defined in Clause 6.5.1.3.3 related with resource utilization analytics triggered by an event or periodically.

6.5.1.3.2 Required Data for Handover Optimization

Following table shows the potential data required to analyse the handover optimization issue.

TABLE 6.5.1.3.2-1

| Potential data required for handover optimization | |
|---|---|
| Data Category | Required Data |
| Performance Measurements | Average/distribution of UE reported RSRPs/ RSRQs/SINRs of each neighbour cell; Packet delay related to neighbour cells as defined in clause 5.1.1.1/5.1.3.3, TS 28.552 [1]; IP Latency to neighbour cells as defined in clause 5.1.3.4, TS 28.552 [1]; Round-trip GTP Data Packet Delay to neighbour cells as defined in clause 5.4.1.9, TS 28.552 [1]; End-to-end Latency of 5G Network to neighbour cells as defined in clause 6.3.1, TS 28.554 [2]; Radio resource utilization: The usage of physical radio resource utilization of the network, clause 5.1.1.2 of TS 28.552[1]; CQI related measurements: The distribution of Wideband CQI reported by UEs, clause 5.1.1.11 of TS 28.552 [1]; Intra-gNB hanodvers: Number of failed handovers in terms of handover preparation/resource allocation/execution and the mean time of handover execution, clause 5.1.1.6 of TS 28.552 [1]; Inter-gNB handovers: Number of failed handovers in terms of handover preparation/resource preparation clause 5.1.1.6.2, TS 28.552 [1]; Frequency Priority Information (i.e., based on deployment) set by the MNOs: Absolute priorities for different NR frequencies or inter-RAT frequencies, clause 5.2.4.1, TS 38.304 [3]; Throughput for network slice instance: Upstream/Downstream throughput for network and Network Slice Instance, clause 6.3.2/ 6.3.3 of TS 28.554 [2]; Throughput at N3 interface: Upstream/ Downstream GTP data throughput at N3 interface, clause 6.3.4/6.3.5 of TS 28.554 [2]; Virtual resource usage of NF: The resource usage of virtual network functions, clause 5.7.1 of TS 28.552 [1]; Data packet loss: Data volume of outgoing GTP data packets per QoS level on the N3 interface, from UPF to (R)AN and via versa clause 5.4.1.6 TS 28.552 [1]. |
| MDT Data | UE measurements related to RSRP, RSRQ, SINR (serving cell and neighbour cells) and UE location information, TS 37.320 [4]. |
| UE location reports | UE location information provided by the LCS with the anonymous ID, which can be used to correlate with MDT reports. |
| QoE Data | QoE measurements collected in TS 28.404 [5] are DASH and MTSI measurements. Detailed mesurements and alternative MDT measuremetns are FFS. |

TABLE 6.5.1.3.2-1-continued

Potential data required for handover optimization

| Data Category | Required Data |
|---|---|
| S-NSSAI | S-NSSAI as defined in clause 5.15.2, TS 23.501 [2], MDAS uses this information to identify target gNBs or inter-RAT cells associated with a network slice perfroming handover optimization and may derive resource utilization and network performance analytics. |
| Configuration Data | Resoure configuration data including RAN and virtualized NFs.<br>The current policy configured in the RAN related to the handover optimization. |

Note: The above parameters may not be the complete list.

6.5.1.3.3 Analytics Report for Handover Optimization

Following table shows the potential information carried in the analytics report of the handover optimization analysis.

| | Attribute Name | Description |
|---|---|---|
| Analytics Report of MDA assisted handover optimization | Identifier of the Handover Optimization issue | The identifier of the handover optimization issue, e.g. user plane congestion or control plane congestion, radio or virtulized. |
| | Indication of resource utilization issue type | Indicates the type of the hadover optimization issue, e.g., ongoing or potential. |
| | Time period | Indicate the duration of the handover optimization issue. |
| | Location | The geographical area, e.g. TA or cells, involved in the handover optimization issue. |
| | List of network entities | Objects involved, e.g. gNB(s), cells or RAT indication. |
| | A List of network slices | List of the network slices involved in the resource utilization issue. |
| | Root cause | The root cause of the handover optimization issue, e.g. temporal load peak, radio conditions, Slice load, reliability, latency, etc. |
| | Criticality | Severity level, e.g. critical, medium, low |
| | Recommendation Actions | Modification of resource consumption and network capabilities with respect to: (i) time period, (ii) service or slice, (iii) specified KPIs, (vi) network conditions, e.g. load threshold.<br>Modification of allocated resources, incluing radio and/or virtualized, or selecting a target cell to accommodate the expected QoE with respect to a service or slice.<br>Ranking, i.e. listing, of potential handover target cells with respect to residing cell considering: (i) indicated KPIs, e.g. throughput, reliability/latency, etc., (ii) handover percentage per target neighbor, e.g. gNB(s), cell(s) or RAT, (iii) service priority, (iv) slice, (v) validity period or validity conditions, e.g. load threshold, (vi) when to apply the policy and for how long, (vii) when to perfrom a HO. |

The invention claimed is:

1. An apparatus comprising:
one or more processors, and
at least one memory storing instructions of a management data analytics service producer for a communication network, the instructions, when executed by the one or more processors, causing the apparatus to perform operations, the operations comprising:
generating a mobility ranking list based on performance relevant information for a plurality of cells of an access node, wherein a cell of the plurality of cells is configured to serve one or more slices, wherein the performance relevant information includes information that indicates a performance of each respective cell of the plurality of cells, wherein for the cell of the plurality of cells that is configured to serve the one or more slices, the information that indicates the performance of the cell is related to the one or more slices served by the cell, and wherein the mobility ranking list comprises entries, for each respective cell of the plurality of cells, wherein each respective entry comprises a respective priority for the respective cell to reserve a radio resource for a terminal, wherein the entry for the cell further indicates, for each respective slice of the one or more slices, a priority for the cell to reserve the radio resource for the terminal served by the respective slice; and
providing the mobility ranking list to at least one cell of the plurality of cells.

2. The apparatus according to claim 1, wherein the generating the mobility ranking list is additionally based on further performance relevant information received from a network function different from each cell of the plurality of cells.

3. The apparatus according to claim 1, wherein the generating the mobility ranking list is additionally based on a domain based mobility ranking list received from an analytics function of an access network comprising at least one cell of the plurality of cells.

4. The apparatus according to claim 1, wherein the operations further comprise:
determining at least one of a respective criticality, a respective validity time, and a respective validity duration for at least one of the respective priorities of the mobility ranking list based on the performance relevant information; and
wherein the providing comprises providing the at least one of the respective criticality, the respective validity time, and the respective validity duration along with the at least one of the respective priorities of the mobility ranking list.

5. The apparatus according to claim 1, wherein the operations further comprise:
collecting the performance relevant information for the plurality of cells from the access node.

6. A method comprising:
generating, by a management data analytics service producer of a communication network, a mobility ranking list based on performance relevant information for a plurality of cells of an access node, wherein a cell of the plurality of cells is configured to serve one or more slices, wherein the performance relevant information includes information that indicates a performance of each respective cell of the plurality of cells, wherein for the cell of the plurality of cells that is configured to serve the one or more slices, the information that indicates the performance of the cell is related to the one or more slices served by the cell, and wherein the mobility ranking list comprises entries, for each respective cell of the plurality of cells, wherein each respective entry comprises a respective priority for the respective cell to reserve a radio resource for a terminal, wherein the entry for the cell further indicates, for each respective slice of the one or more slices, a priority for the cell to reserve the radio resource for the terminal served by the respective slice; and providing, by the management data analytics service producer, the mobility ranking list to at least one cell of the plurality of cells.

7. The method according to claim 6, wherein the generating the mobility ranking list is additionally based on further performance relevant information received from a network function different from each cell of the plurality of cells.

8. The method according to claim 6, wherein the generating the mobility ranking list is additionally based on a domain based mobility ranking list received from an analytics function of an access network comprising at least one cell of the plurality of cells.

9. The method according to claim 6, further comprising:

determining at least one of a respective criticality, a respective validity time, and a respective validity duration for at least one of the respective priorities of the mobility ranking list based on the performance relevant information; and wherein the providing comprises providing the at least one of the respective criticality, the respective validity time, and the respective validity duration with the at least one of the respective priorities of the mobility ranking list.

10. The method according to claim 6, further comprising:

collecting the performance relevant information for the plurality of cells from the access node.

11. A non-transitory computer-readable medium storing instructions of a management data analytics service producer for a communication network, the instructions, when executed by an apparatus, causing the apparatus to perform operations, the operations comprising:

generating a mobility ranking list based on performance relevant information for a plurality of cells of an access node, wherein a cell of the plurality of cells is configured to serve one or more slices, wherein the performance relevant information includes information that indicates a performance of each respective cell of the plurality of cells, wherein for the cell of the plurality of cells that is configured to serve the one or more slices, the information that indicates the performance of the cell is related to the one or more slices served by the cell, and wherein the mobility ranking list comprises entries, for each respective cell of the plurality of cells, wherein each respective entry comprises a respective priority for the respective cell to reserve a radio resource for a terminal, wherein the entry for the cell further indicates, for each respective slice of the one or more slices, a priority for the cell to reserve the radio resource for the terminal served by the respective slice; and providing the mobility ranking list to at least one cell of the plurality of cells.

12. The non-transitory computer-readable medium according to claim 11, wherein the generating the mobility ranking list is additionally based on further performance relevant information received from a network function different from each cell of the plurality of cells.

13. The non-transitory computer-readable medium according to claim 11, wherein the generating the mobility ranking list is additionally based on a domain based mobility ranking list received from an analytics function of an access network comprising at least one cell the plurality of cells.

14. The non-transitory computer-readable medium according to claim 11, wherein the operations further comprise:

determining at least one of a respective criticality, a respective validity time, and a respective validity duration for at least one of the respective priorities of the mobility ranking list based on the performance relevant information; and wherein the providing comprises providing the at least one of the respective criticality, the respective validity time, and the respective validity duration with the at least one of the respective priorities of the mobility ranking list.

15. The non-transitory computer-readable medium according to claim 11, wherein the operations further comprise:

collecting the performance relevant information for the plurality of cells from the access node.

* * * * *